(No Model.)
L. A. BRIERE.
COUPLING BAR FOR LOCOMOTIVES.
No. 502,653.  Patented Aug. 1, 1893.
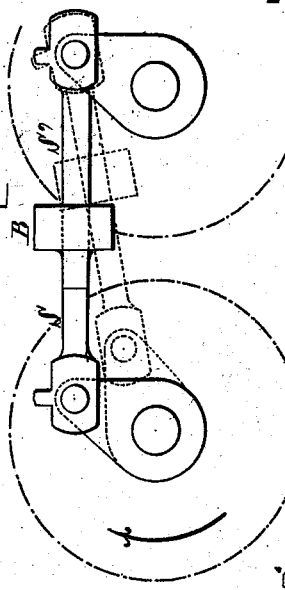
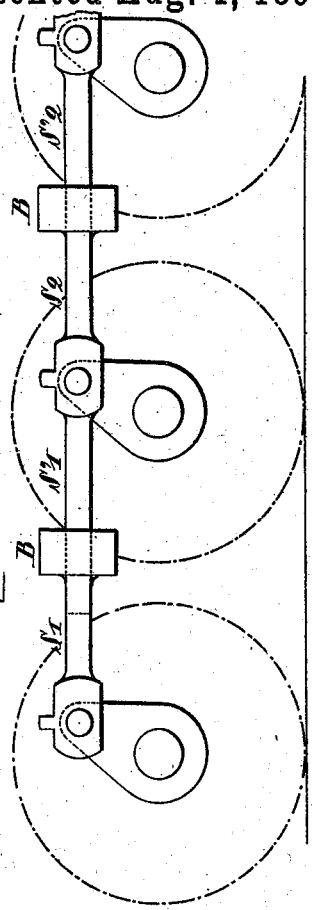
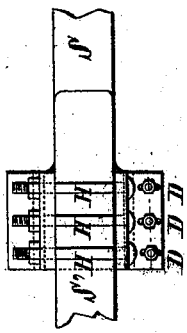
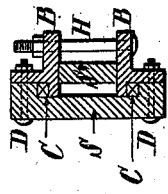
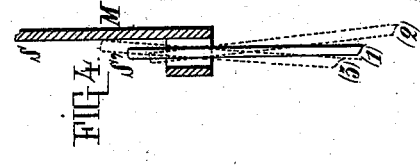
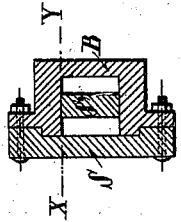
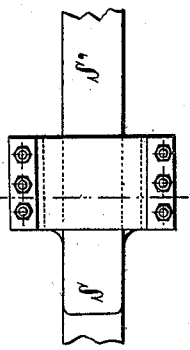
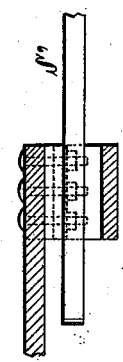
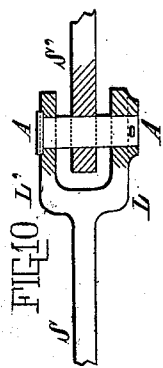
Attest:
Arthur A. Erb
Reeve Lewis
Inventor:
Louis A. Brière
by his attorney

UNITED STATES PATENT OFFICE.

LOUIS ANATOLE BRIERE, OF PARIS, FRANCE.

COUPLING-BAR FOR LOCOMOTIVES.

SPECIFICATION forming part of Letters Patent No. 502,653, dated August 1, 1893.

Application filed June 8, 1893. Serial No. 476,936. (No model.) Patented in France November 9, 1892, No. 225,522.

*To all whom it may concern:*

Be it known that I, LOUIS ANATOLE BRIERE, of Paris, France, have invented certain new and useful Improvements Relating to the Coupling of Wheels of Locomotive-Engines and Railway-Vehicles, which are fully described in the following specification, and which have been patented in France, No. 225,522, dated November 9, 1892.

My invention relates to the coupling of wheels of locomotive engines and railway vehicles.

The said invention has for its object to enable the number of coupled axles to be increased and consequently the tractive force to be augmented while facilitating the passage of the coupled axles around curves.

The problem which I propose to solve is as follows: Two consecutive axles susceptible of angular, longitudinal or lateral displacement relatively to each other, being provided with wheels of the same diameter, the object is to connect them, by substituting for the ordinary rigid coupling rod of invariable length an adjustable coupling rod which allows the axles to move independently and does not therefore interfere at all with their relative displacement, supposing of course that there is no obstacle to such coupling. Attempts have heretofore been made to achieve this result by the aid of gear wheels, endless chains and the like. For this purpose I make use of the coupling rod.

In order that my said invention may be readily understood I have represented by way of example in the accompanying drawings my improved system of coupling.

Figure 1 is an elevation of the junction box. Fig. 2 is a vertical section on the line T—Z. Fig. 3 is a horizontal section on the line X—Y. Figs. 4 and 5 show the several positions which the segments may occupy relatively to each other. Figs. 6, 7, 10 and 11 illustrate modifications. Figs. 8 and 9 are side elevations.

Imagining that an ordinary coupling rod uniting two consecutive axles is cut into two parts which may be of unequal length, and that after having separated the two segments a little from each other parallel to themselves they are prolonged so that they pass by the side of each other a certain length, I widen the free end of one of the two segments S to provide two bearings (Figs. 1, 2, and 3) in order that I may firmly fix thereto a piece B preferably made of cast steel and which I will call a junction box, presenting an interior space the height of which is exactly equal to the supposed constant height of the other rod segment S′ so that the latter, engaging with the cavity may slide therein with little friction precisely in the middle when the engine is on a straight line. The width of this cavity is sufficient for enabling the segment S′ to perform lateral oscillations the nature of which will hereinafter be explained. Thus constituted the improved coupling rod is ready to operate, with a reservation to which I will now refer. It should be remembered first that the coupling rods have no very great transverse strain to bear except around curves of the railway. But there is on the other hand a component of the tangential force transmitted by the crank; this component passes in the direction of the length of the coupling rod and it is absolutely necessary to neutralize it. Otherwise the two segments would simply slide one upon the other and the coupling would not take place. I will hereinafter state how this difficulty may disappear. Suppose it for the moment solved and see how my system of coupling will work on a straight line and around a curve. On a straight line the two segments S and S′ are parallel, and as they cannot be separated in the direction of the height the rod operates like an ordinary coupling rod. Around a curve, several cases have to be examined, first that of divergent axles, which for example occurs for the last axle of the engine and the first axle of the tender even when they are deprived of all play. Suppose the junction boxes are fixed upon the outer faces of the segments S and not upon the inner faces or those which are turned toward the line. The outer rod that is to say the one placed on the side farthest away from the center of the curve tends to bend and lengthen while the inner rod tends to bend and shorten. In contradistinction from ordinary rigid coupling rods of invariable length my improved adjustable coupling rods easily adapt themselves to this double action. In the outer rod is produced a sliding movement and a reciprocal inclination of the two segments one relatively to the other. The segment which occupied the position (1) passes to the position (2) (see diagram Fig. 4). In the interior of the curve the inverse effect is produced (same figure), and the sliding of the two segments corresponding here to a shortening of the rod brings the segment S′ to the point M. The segment then occupies the position (3) indicated in dotted lines. All these effects are produced without any difficulty and permit of the divergence of the axles which nevertheless do not cease to be connected. If in lieu of being able to assume divergent positions the neighboring axles to be connected were constrained to remain parallel while possessing a certain amount of lateral play, as often happens when they belong to the same frame, the segment S′ would be displaced parallel to itself, approaching according to circumstances now the segment S and then the interior side of the junction box (diagram Fig. 5). Lastly, if the two kinds of relative displacement before examined occur simultaneously which ordinarily happens when the two axles belong to different frames, these displacements will take place without any more difficulty than before, provided the width of the junction box and the initial separation of the segments be sufficient.

I will now describe some details of construction which result from the nature of the device.

First. Sometimes too much play or beating of the segment S′ in the junction box might have to be feared. Suppose this inconvenience to exist it appears to be easy to suppress it or at least to diminish it sufficiently by means of two springs fixed to the interior vertical sides of the box and of the segment S, which springs press the segment S′ more or less strongly between them.

Second. The pressure against the upper and lower edges of the segment S′ being very strong it will be advantageous to give the segment in question an I shaped section at least in the part susceptible to come in contact with the junction box. This widening of the lower and upper parts of the second segment S′ may however be obtained by various known means, for instance by angle-irons or by a lining or the like. It may be observed that compared with certain other parts of the locomotive engine the segment S′ has in its box but rarely small movements, which enables the lubricating device, if not to be dispensed with, at least to be reduced to the minimum.

Third. It is clear that the segments S and S′ as they do not coincide, must be arranged on their respective pins at unequal distances from the crank.

I will now revert to the difficulty before referred to with regard to the effects of the tangential force. The component of this force, as I have stated is parallel to the direction of the coupling rod; and this component would have the effect of either causing the segment S′ to move back into the box of the segment S or to pass out according to circumstances. There would therefore be a shortening or lengthening of the rod not compensated for by concordant movements in the crank pins, contrarily to what takes place when the reciprocal sliding movement of the two segments is determined by the passage of the axles around curves of the line. The two segments would consequently cease to be parallel to the rolling plane, and no coupling could take place (see diagram Fig. 8). Accordingly it is needful to oppose such an injurious effect, for which purpose it is sufficient to maintain the two segments S and S′ by any suitable means always parallel to the rolling plane in the to and fro movements which they perform. Now this result will be obtained if one segment S′$^1$, (diagram Fig. 9) is firmly connected with the other segment S$^2$ attached to the same pin and placed on the other side. From the moment when the two segments S′$^1$ and S$^2$ are firmly connected, one of them S′$^1$ cannot oscillate and occupy an inclined position relatively to the rolling plane nor consequently slide upon the adjoining segment S′ under the action of the tangential force alone. The position parallel to the rolling plane being maintained by all the rod segments without exception, the coupling is then insured. It would be the same if the segments S$^2$ and S′$^2$ were replaced in the space between the second and third axles by an ordinary rod.

In order that the coupling may take place it will generally be sufficient that one of the two segments S or S′ forms one piece either with the neighboring segment or with the ordinary coupling rod attached to the same journal or pin. From this it results that with the improved system of rods the coupling cannot take place for two pairs of wheels only. It requires at least three coupled axles, which will almost always be the case when the question of its employment has to be considered. The part thus formed by the union of the two segments S and S′ attached to the same journal operates exactly like ordinary coupling rods. And generally speaking from this point of view, whether the segments S and S′ are separated at the extremity of a series of coupled axles, or whether being placed in an intermediate position, they are connected two and two as before explained, the well-known means, both as to constructing the heads of the rods and keeping them upon the crank pins at the desired distances, are applicable to them in every particular. Instead of making the two segments and the head of wrought iron, when these three parts are to form one piece, I may if preferred form the head of the two parts connected as in the case of the heads with a removable strap. The said strap is then made of wrought metal either with the segment or with the ordinary rod to which it is attached.

Figs. 6 and 7 represent an arrangement of the junction box which appears to me especially adapted for connecting the locomotive engine with its tender. As shown in the drawings, the box is formed of two distinct parts connected on one side by bolts and held on the other side by means of wedges C against the two bearings provided on the segment S. By employing wedges of various thicknesses I may vary the interior height of the junction box by means of nuts on bolts H. The bolts D D D pass through holes made oval in the vertical direction in order that they may adapt themselves to these movements.

The principal application of my system of coupling appears to be to utilize the adhesion of the tender, the wheels of which must in this case of course have the same diameter as those of the engine to which they may be connected. For instance in the case of a goods engine with three axles coupled by ordinary connecting rods and its tender carried by two or three pairs of wheels I unite the latter together by the aid of ordinary coupling rods. Then I unite the engine with the tender by two of my improved coupling rods, one or both of the segments forming one piece with the ordinary neighboring rods. In view of the great distance which generally separates the last pair of wheels of the engine and the first pair of wheels of the tender I may if desired place the junction box on the inner face of the segment S. Even in this comparatively unfavorable position the box will almost always have the room necessary for its operation without coming in contact with the wheels. But generally the arrangement of the junction box on the outer face of the segment S appears to be preferable.

If there be occasion for it I may connect any vehicle to the tender in a similar manner to that hereinbefore described for coupling the tender to the engine.

In the case of axles belonging to the same frame the ordinary connecting rods are in general applicable to two or three pairs of axles at least. It is rarely necessary to replace them by adjustable rods. However when it is desired that the transverse play, perpendicular to the transverse axis of the frame provided with one or more coupled axles, shall operate with facility, and also when it is proposed to add one or more axles to the series of axles already coupled, it will be expedient as regards the axles in question to use my coupling rods, each intermediate axle carrying the segment S' and the segment S which form one piece together as before explained and following one another in the same order for all the axles. It is then needful, for insuring the coincidence of the segments S' with the boxes of the first segments S to distribute these boxes alternately on the inner and outer faces of the segments S which, consequently recede from and approach alternately the outer plane of the wheels. I may however if desired arrange on one side only, either on the inside or on the outside of the box, all the junction boxes without exception, placing them upon the two rod segments attached to the same journal instead of alternating them. Each journal then bears only upon segments of the same kind, namely, either the second S' or the first S.

For facilitating the placing and operation of the boxes under certain circumstances, they may also be placed nearer the axles to which the segments carrying them are attached; for it is not absolutely necessary that the segments S and S' should be equal, and that the box should occupy precisely the middle of the system of coupling.

When the system of coupling is employed for connecting axles belonging to the same frame and having no other than lateral play, that is to say perpendicular to the longitudinal axis of this frame or if desired parallel to the axis of the axle itself, the property possessed by this system of adapting itself to variations in the respective distances of the coupled axles and also to changes in their parallelism is not utilized, because there is no necessity either for any lengthening or shortening or for any angular displacement. In this case I use a simpler arrangement which I will proceed to describe.

When a locomotive engine has more than two connected axles the ordinary coupling rods which follow each other in succession in the same vertical plane are, with the exception of a single one next to the driving rod, provided with an articulation having a horizontal axis placed at the extremity nearest to this exceptional rod which when alone presents no discontinuity. These articulations have for their object to adapt themselves to small changes of level resulting on the same line of rails either from the sinking of a sleeper or from other cause, and obviating the inconveniences which may arise if the whole furnished by the succession of rods in a straight line were absolutely rigid. These articulations are constituted by prolonging the strap of the head of the connecting rod which precedes the intermediate axis considered, giving generally to this prolongation or appendix the form of a tenon rounded at the end, and embraced with little friction by the two branches of the fork which terminates the following rod on this side. The tenon and the two branches of the fork are traversed by a thick pin or bolt which serves as an axis for the very limited motions which these parts have to make relatively to each other. It is these articulations which I utilize, modifying them so as to obtain the desired result, the coupling being maintained while the lateral play of the coupled axis is allowed.

For fulfilling their new duty the articulations must be modified as follows: The two branches of the fork instead of embracing the prolongation on the head of the neighboring rod with little friction must be apart from each other by reason of the lateral play which the axles are to have. The opening of the fork being also considerably enlarged the axis A which forms one piece with the two branches must itself be much prolonged (Figs. 10 and 11). This axis traverses freely the tenon, or prolongation S' of the preceding rod, and the tenon may, as it slides all along the axis A, approach now one and now the other of the two branches L and L' of the fork. When I utilize it for obtaining this new result it is no longer necessary that the articulation should be placed in proximity to the heads of the rod. It will on the contrary be advantageous to place them in or near the middle of the intermediate axis. The relative, lateral movements of the parts of the articulation appear to be greatly facilitated in this new place. The tenon thus lengthened then will be altogether analogous to the segment S' hereinbefore mentioned.

Figs. 10 and 11 of the accompanying drawings show the device which is placed near the middle of the said intermediate axis. One of the two segments of the connecting rod S and S' forming the system of coupling which occupies the said intermediate axis, carries the fork while the other pierced at its extremity can slide upon an axis A, keyed in the branch L, in the direction in which the axle to which it is attached can slide. By employing an inverse arrangement I may fix the axis A in the segment S' and render the fork movable upon this axis, but it is then needful to give the latter an inconveniently great length which becomes useless and disappears if on the contrary the second segment is movable upon the axis. To obtain in ordinary coupling rods the possibility of making a very small angular displacement the articulation with the horizontal axis is sometimes preceded by another articulation with a vertical axis. Nothing is opposed to the employment of this articulation with a vertical axis under the same conditions in conjunction with my device.

Although the invariableness of length neutralizes in the system which I here describe and also in ordinary connecting rods the capacity possessed by the rod of inclining upon the axle in the horizontal plane and although this capacity can be brought to bear only within the narrowest limits in the case of axles the parallelism and distance of which remain constant (cases which I consider exclusively here) a little extension in the service rendered by my system may result from the use of the articulation with a vertical axis. I may observe similarly as the system of coupling above described the present arrangement insures at the same time the coupling and the lateral play of the coupled axles without at all altering the strictly invariable position relatively to the wheels which the heads of the rods must occupy upon their journals which should suitably follow all the displacements. Naturally the heads of the rods are more or less projecting according as the modified articulations just described, which then form a projection upon the body of the rods, compel the latter to recede more or less from the wheels. But this distance from the head of the rod to the wheel which carries it remains invariable, because the length of the journals corresponds exactly to the width of the head of the rod. I make this observation which sets forth an essential feature of my system, because of late years quite the opposite principle has been employed. Given a series of coupled axles the journal of the last of these coupled axles has been lengthened in such a manner that they can slide in the heads of the rods. These heads then recede from or approach the neighboring wheel according as the coupling rod is inside or outside the curve described by the line. This is precisely the reverse of what I have described and sought to realize.

As regards the lubrication a displacement of a few millimeters which represent in the passage on to and from a curve of the line the sliding movement of the segment S' upon its axis H does not appear to me, at least in general, to justify sufficiently the construction of a special device with bearings, keys and the like similar to that of an ordinary coupling rod. It is advisable not to needlessly burden parts, which, like coupling rods, are a source of disturbance in the movements of the engine.

A comparison with the system of coupling previously described will show that this arrangement possesses the following advantages:—first, it is simpler and lighter; second, in a straight line the successive coupling rods, or more exactly the partial rod segments which form the system of coupling, are all in the prolongation of one another, that is to say in the same vertical plane. Despite this fact I do not think that this arrangement gives in practice, even in the special case to which it is exclusively applicable, as good results as the system of coupling previously described.

Figs. 10 and 11 are guides only in order to render the explanations understood. I may greatly vary the details of construction, for example, the mode of fixing the axis A in the branches of the fork.

For diminishing the great width of the junction box I may modify the coupling rod as regards its dimensions with the object of imparting to it when possible a certain flexibility in the transverse direction without injuriously reducing its rigidity and its resistance in the direction of the height.

It may be observed that the section of a part operating, like the coupling rods, almost exclusively under the action of vertical or longitudinal strains has of course a very much greater dimension in height than in thickness; the thicknesses generally used for such parts may even be diminished to a certain point, if this diminution be compensated for by an augmentation of the height. In this manner a certain flexibility might possibly be communicated to the coupling rod in the transverse direction, which although very slight is sufficient for enabling the reciprocal sliding movement of the two segments in the passage around curves to be effected without difficulty even after the segments should have been previously brought into direct contact. The length of the junction box would thereby be reduced to that necessary for the reception of the thickness of the segment S'. This does not appear to me impossible, at least for certain engines the coupling rods of which, as they need not transmit very considerable strains especially when they are very far away from the driving axle, have comparatively small dimensions. For this latter case tough steel is the metal preferably employed.

What I claim is—

1. The combination with the drive-wheel axles, of a coupling-rod connecting the cranks of said axles, said rod being formed of two parts whose adjacent ends overlap, a junction-box connecting the two segments and permitting movement thereof relatively to each other in a plane parallel with the axles, and means as specified for keeping the segments always parallel to the rolling plane, substantially as described.

2. The combination with the drive-wheel axles, of a coupling-rod composed of two segments whose adjacent ends overlap, a junction-box connecting the two segments rigidly in a vertical direction, but permitting relative movements of the sections longitudinally and laterally, in a horizontal plane or plane parallel with the axles, substantially as described.

3. The combination with three or more drive-wheels, of a coupling-rod connecting the axles of said wheels, said coupling-rod being composed of two parts connected by a joint between two adjacent wheels permitting relative movement of the two parts in a plane parallel with said axles, one part of said rod connected to the crank of an intermediate wheel being rigidly attached to, or of one piece with, the rod on the other side of said wheel, substantially as described.

4. The combination with the axles of three or more drive-wheels, of a coupling-rod connecting the cranks of said axles, said rod being composed of parts or segments whose adjacent ends overlap, and a horizontal pivot pin passing through the ends of two overlapping segments, said pin being of such length as to permit lateral play of the two segments relatively to each other, substantially as described.

In testimony whereof I have signed this specification in the presence of two subscribing witnesses.

LOUIS ANATOLE BRIERE.

Witnesses:
 ROBT. M. HOOPER,
 JEAN VICTOR BARBANCE.